(12) United States Patent
Prasse et al.

(10) Patent No.: US 7,694,123 B2
(45) Date of Patent: Apr. 6, 2010

(54) STORING FILES FOR OPERATING SYSTEM RESTORATION

(75) Inventors: David Prasse, Richardson, TX (US); Marc T. Higgins, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 893 days.

(21) Appl. No.: 11/391,593

(22) Filed: Mar. 28, 2006

(65) Prior Publication Data
US 2007/0234022 A1 Oct. 4, 2007

(51) Int. Cl.
*G06F 15/177* (2006.01)
(52) U.S. Cl. .................... 713/2; 714/15; 714/36
(58) Field of Classification Search ............. 713/2; 714/15, 36
See application file for complete search history.

(56) References Cited

U.S. PATENT DOCUMENTS

| | | | | |
|---|---|---|---|---|
| 6,519,762 | B1 * | 2/2003 | Colligan et al. | 717/170 |
| 6,625,754 | B1 * | 9/2003 | Aguilar et al. | 714/15 |
| 7,024,581 | B1 * | 4/2006 | Wang et al. | 714/2 |
| 7,136,973 | B2 * | 11/2006 | Sinclair | 711/156 |
| 2004/0083357 | A1 * | 4/2004 | Duncan et al. | 713/2 |
| 2004/0255106 | A1 * | 12/2004 | Rothman et al. | 713/1 |
| 2006/0112313 | A1 * | 5/2006 | Tripp et al. | 714/36 |

* cited by examiner

*Primary Examiner*—Thuan N Du

(57) ABSTRACT

A computer system comprising a processor, a first storage coupled to the processor and comprising an operating system, and a second storage coupled to the processor. The processor is adapted to store a group of files pertaining to the operating system on the second storage prior to launching the operating system. The processor is capable of using the group of files to restore the operating system.

19 Claims, 2 Drawing Sheets

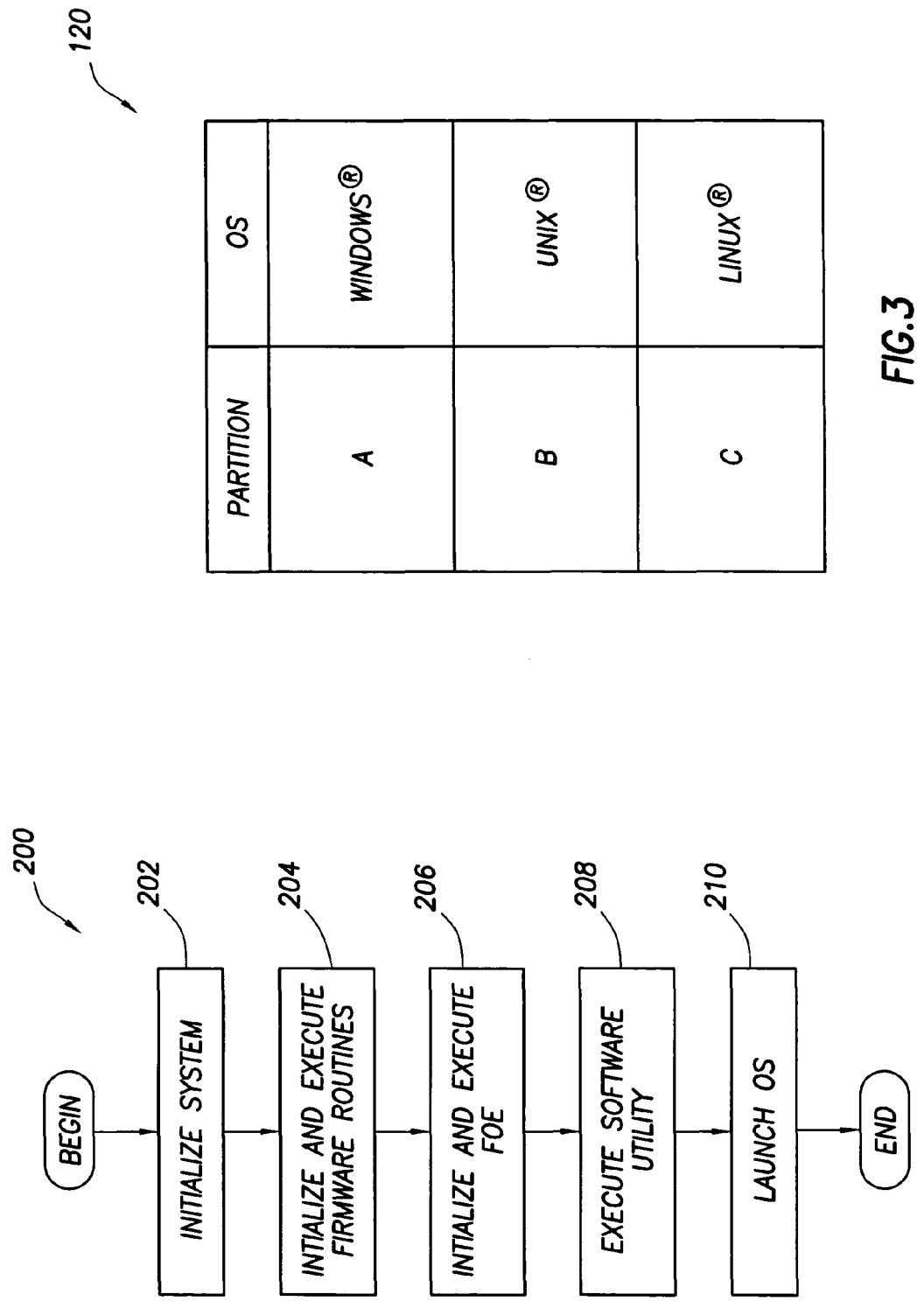

STORING FILES FOR OPERATING SYSTEM RESTORATION

BACKGROUND

An operating system (OS) comprises computer system software that directly controls and manages the computer system hardware and various other system operations. The OS also provides a platform upon which to run software applications, such as word processing programs and Web browsers.

An OS is subject to corruption and other types of damage which may render the OS useless. Accordingly, an OS image, which is a group of files that comprise various information pertaining to the OS (e.g., OS settings, OS updates), is regularly backed-up to storage. When the OS is damaged, the backed-up OS image is used to restore OS functionality. However, restoring the OS from the backed-up image can be via a process that is OS-specific and thus undesirably time-consuming and inconvenient.

BRIEF DESCRIPTION OF THE DRAWINGS

For a detailed description of exemplary embodiments of the invention, reference will now be made to the accompanying drawings in which:

FIG. 2 shows a flow diagram of a boot-up sequence for saving and restoring an operating system image, in accordance with preferred embodiments of the invention; and FIG. 3 shows a data structure in accordance with embodiments of the invention.

NOTATION AND NOMENCLATURE

Figure 1:
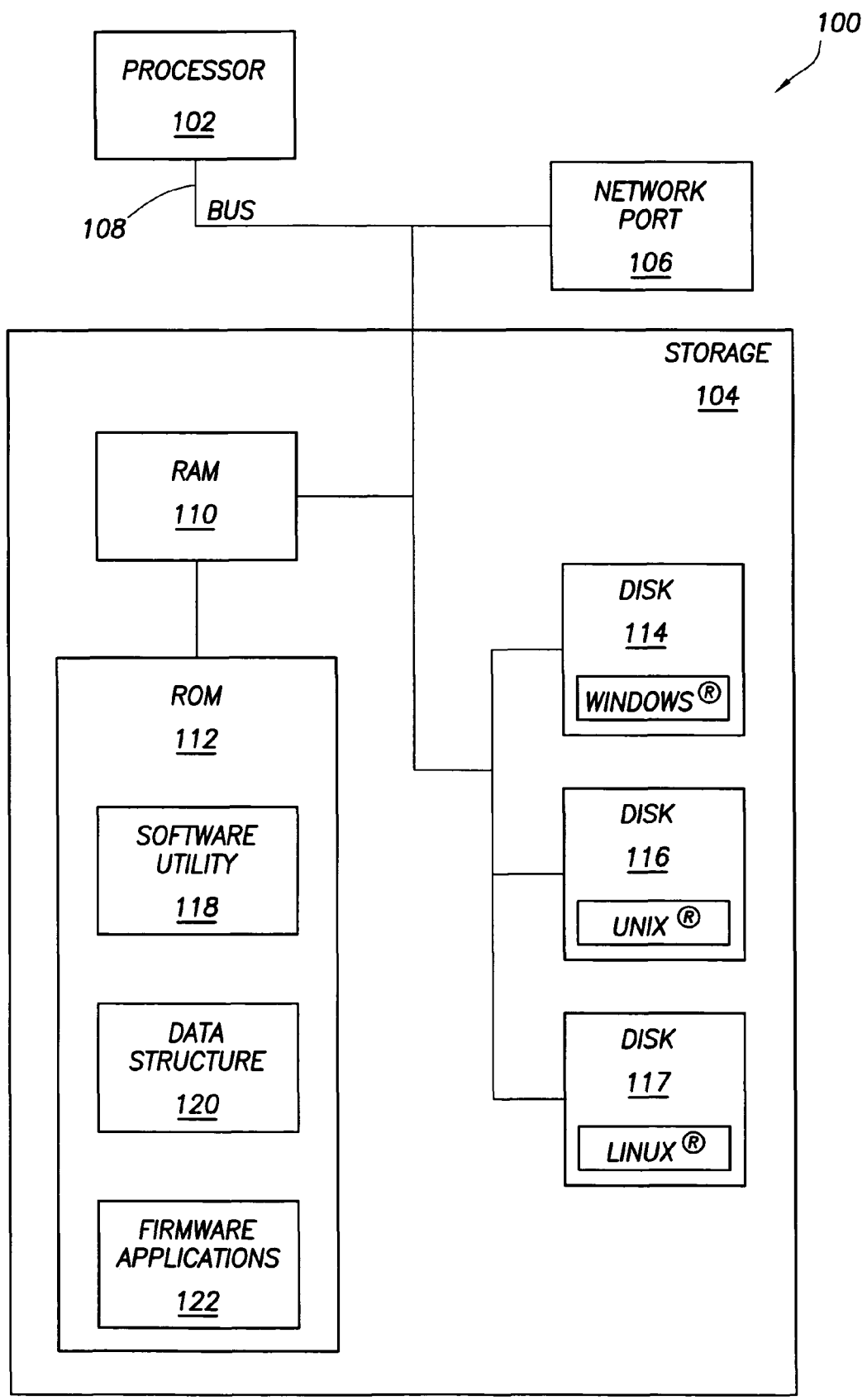
FIG. 1 shows a block diagram of a computer system in accordance with embodiments of the invention.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "storage" refers to any module or group of modules capable of storing data. For example, a random access memory (RAM) module, as well as a group of RAM modules, may be termed "storage." An operating system (OS) image may be defined as a group of files which pertain to an OS and which may be used to restore the OS should the OS become corrupt or otherwise damaged.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein is a technique by which a computer system is able to save and restore operating system (OS) images and other data files independent of the type of OS being used. Specifically, the technique comprises saving and/or restoring OS images during, for example, system boot-up, and more specifically, prior to the initialization of an OS stored on the system.

FIG. 1 shows a hardware block diagram of a computer system 100 in accordance with embodiments of the invention. In some embodiments, the computer system 100 comprises a server, such as a file server, a disk server, a database server, a transaction server, an application server, etc. In at least some embodiments, the system 100 comprises a blade server or some other type of rack-mountable server. In other embodiments, the computer system 100 may comprise a personal computer (PC) or a mobile communication device. The computer system 100 comprises a processor 102, storage 104, a network port 106, and an electronic bus 108 which couples together the processor 102, storage 104 and the network port 106. The system 100 also may comprise additional devices not specifically shown in FIG. 1, such as a CD-ROM drive, a keyboard, a mouse, a display, or any of a variety of other input/output devices. The network port 106 may be capable of wired and/or wireless connections.

In at least some embodiments, storage 104 comprises random-access memory (RAM) 110, a read-only memory (ROM) 112, and/or a plurality of disks 114, 116 and 117. In some embodiments, the disks 114, 116 and 117 comprise hard disks, although the disks also may comprise other types of storage devices (e.g., optical devices). Moreover, although only three disks are specifically shown in FIG. 1, the scope of disclosure is not limited to any particular number of disks. The ROM 112 may comprise various software applications suitable for execution by the processor 102. In at least some embodiments, software is copied from the ROM 112 to the RAM 110 for execution by the processor 102.

Referring still to FIG. 1, the ROM 112 comprises a software utility 118, a data structure 120 and one or more firmware routines 122. When executed, the software utility 118 causes the processor 102 to save or restore an OS image in accordance with embodiments of the invention, as described further below. The data structure 120 is used in conjunction with the software utility 118 and is also described below. The firmware routines 122 are executed by the processor 102 to perform a variety of basic functions (e.g., hardware initialization) for the system 100. One or more of the disks 114, 116 and 117 may store one or more OSes, such as LINUX®, WINDOWS®, UNIX®, HPUX and/or DOS®, which is executed by the processor 102. In the context of FIG. 1, disk 114 is shown as storing a WINDOWS® OS, disk 116 is shown as storing a UNIX® OS, and disk 117 is shown as storing a LINUX® OS.

When the computer system 100 is powered up, for example by a user pressing an "on" button (not specifically shown), the system 100 undergoes a boot sequence. The boot sequence is a set of operations the system automatically performs upon startup in order to prepare the system for use. Although the boot sequence varies among systems, in at least some embodiments, the system 100 has a boot sequence such as the sequence 200 shown in FIG. 2. Specifically, the sequence 200 begins with the user launching the boot sequence (block 202), for example, by pressing the system "on" button or restarting the system 100. The sequence 200 continues by initializing and executing firmware routines 122 (block 204). The firmware routines 122 cause the processor 102 to perform various initialization tasks. For instance, when executed, the firmware routines 122 may cause the processor 102 to initialize various system hardware devices (e.g., keyboard, mouse, display) for use.

The sequence 200 further comprises initializing a firmware operating environment (FOE) (block 206). The FOE comprises an application, possibly stored on the ROM 112, which performs various tasks to prepare the system 100 for use. The FOE is provided with system resources such as I/O device drivers and other resources which enable execution of the software utility 118. Accordingly, the FOE causes the processor 102 to execute the software utility 118 (block 208). As described in detail below, when executed, software utility 118 causes the processor 102 to copy an image of an OS from one disk to another. For example, the processor 102 may copy an image of the OS on disk 114 to disk 116. After the FOE has finished execution, the sequence 200 comprises launching the OS (block 210).

Because the FOE launches the OS after the firmware has finished execution, it serves as an interface between firmware execution and OS execution. Furthermore, because the FOE occurs prior to launch of the OS, most or all firmware operations, including execution of the software utility 118, are independent of the type of OS being executed. That is, regardless of whether the system 100 uses one or more of WINDOWS®, LINUX®, etc., the firmware level operations remain largely the same.

When executed, the utility 118 causes the processor 102 to copy an image of the OS on disk 114 to disk 116. As previously described, the OS image comprises a group of files which contain various information pertaining to the status of the OS. Such information may comprise OS settings, OS updates, .exe files, .dll files, etc. In some cases, because the group of files may be stored in various locations across the disk 114, the utility 118 may cause the processor 102 to copy some or all of the contents of disk 114 to disk 116. In this way, the OS image is backed up to a second disk and, in case the OS stored on the disk 114 becomes corrupted, the OS image is available on the disk 116 to restore the OS on disk 114.

The sequence 200 of FIG. 2 also may be used to restore the OS image from disk 116 to disk 114. For instance, if the OS on disk 114 becomes corrupt during use, an end-user of the system 100 may restart the system. During the FOE stage, the software utility 118 is executed, thereby enabling the end-user to instruct the utility 118 to restore the OS image of disk 116 to disk 114. In this way, files of the OS on disk 114 are overwritten or otherwise replaced or fixed, thus correcting the corrupt OS. The utility 118 is able to copy the image of any type of OS, since the utility 118 is executed prior to launch of the OS on the system 100.

In some embodiments, an end-user of the computer system 100 is able to provide instructions to the software utility 118. Specifically, when executed, the utility 118 may present an end-user of the computer system 100 with a command prompt (e.g., on a display) whereby the user may enter instructions for the utility 118. An illustrative instruction may be as follows:

make_image [specific] [source] [destination]

The illustrative instruction above comprises a command, "make_image," which the utility 118 recognizes as a command to copy an OS image from the disk specified as the source to the disk specified as the destination. The [specific] field may be used to add specific instructions. For example, a parameter may be entered into the [specific] field to compress the OS image, to specify a data path to store the image, etc. The illustrative instruction above may be used to backup an OS image or to restore an OS image. The scope of disclosure is not limited to the illustrative instruction above, and other instruction types and formats may be used.

The discussion above assumes that an OS image is backed up from disk 114 to disk 116. However, the OS image may be backed up to other disks or other storage. For example, in at least some embodiments, the OS image may be backed up to another disk (e.g., disk 117) within the system 100, a disk coupled to the system 100 via the network port 106, a storage area network (SAN) coupled to the system 100 via the network port 106, a disk array such as a redundant array of independent disks (RAID), removable media such as CDs, DVDs, tapes and USB storage devices such as USB flash drives, or any of the above housed within another computer system coupled to the system 100 via the network port 106. In some embodiments, the OS image from disk 114 may be stored to more than one storage device. As the OS image from disk 114 is copied to disk 116, so may the image of any OS on any disk be copied to any other disk (e.g., disk 116 to 117, disk 117 to 114, etc.).

Also, in some embodiments, one or more of the disks 114, 116 and 117 may store multiple OSes. In such cases, an end-user of the system 100 may instruct the software utility 118 to backup one, some or all of the OSes stored on the disk 114. In some embodiments, the software utility 118 may cause the processor 102 to copy OS images from both disks 114 and 116 to the third disk 117 or to some other storage device. The end-user of the system 100 may interact with the system 100 using input/output devices connected directly to the system 100. Alternatively, the end-user may be in a remote location (e.g., in another building, city, etc.) and may control the system 100 via network port 106.

In some cases, the computer system 100 may be physically and/or virtually partitioned. Such partitions enable the system 100 to execute different OSes. In the case of a physical partition, specific hardware components of the system 100 may be dedicated to the execution of specific OSes. In the case of a virtual partition, hardware components of the system 100 may be shared among the various OSes. Thus, for example, one partition may run both WINDOWS® and LINUX® while another partition runs UNIX®.

The OS that is run by the computer system 100 depends on the partition that is selected during the boot-up sequence. In some embodiments, an end-user of the system 100 is given the option (e.g., during the FOE stage) to select a partition. In other embodiments, the system 100 may be set to a default partition. When executed, the utility 118 is able to cause the processor 102 to backup images of any OSes on the selected partition. For example, assume the end-user selects a partition of the system 100 that is able to run both the WINDOWS® and LINUX® operating systems. Accordingly, when the utility 118 is executed, the user may be provided the option to backup images for WINDOWS®, LINUX®, or both.

The data structure 120 (FIG. 1) cross-references partitions with corresponding OS images. The software utility 118 uses the data structure 120 to determine which OS images the user may select to backup. FIG. 3 shows an illustrative view of the data structure 120. As shown, the data structure 120 comprises partitions A, B and C. Partition A of the computer system 100 runs WINDOWS®, Partition B runs UNIX®, and Partition C runs LINUX®. In case Partition A is selected during the boot-up sequence, the software utility 118 refers to the data structure 120 and determines that the end-user may backup an OS image for WINDOWS®. In case Partition B is selected during the boot-up sequence, the software utility 118 refers to the data structure 120 and determines that the end-user may backup an OS image for UNIX®. Likewise, in case Partition C is selected, the software utility 118 refers to the data structure 120 and determines that the end-user may backup an OS image for LINUX®.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a processor;
   a first storage coupled to the processor and comprising an operating system; and
   a second storage coupled to the processor;
   wherein the processor stores a group of files pertaining to the operating system on the second storage prior to launching the operating system stored on the first storage;
   wherein the processor uses the group of files to restore the operating system on the first storage.

2. The computer system of claim 1, wherein the processor stores the group of files by copying the first storage to the second storage.

3. The computer system of claim 1, wherein the first and second storages are coupled via a communications network.

4. The computer system of claim 1, wherein said operating system is selected from a plurality of operating systems, each of said operating systems corresponding to a different computer system partition.

5. The computer system of claim 4, wherein the system comprises a data structure which cross-references each of said operating systems with a corresponding computer system partition.

6. The computer system of claim 1, wherein the processor copies said group of files to the first storage to restore said operating system.

7. The computer system of claim 1, wherein the processor stores the group of files on the second storage during a boot-up sequence and prior to launching the operating system in said boot-up sequence.

8. The computer system of claim 1, wherein the processor stores said group of files during a firmware stage.

9. A partitioned system, comprising:
   a processor;
   a storage coupled to the processor and comprising a plurality of operating systems; and
   a data structure cross-referencing each system partition with one or more of the operating systems;
   wherein the processor uses the data structure to determine which of the operating systems corresponds to a selected partition and copies an image of a corresponding operating system from said storage to a different storage.

10. The system of claim 9, wherein the processor copies said image during a boot-sequence and prior to launching an operating system during said boot-sequence.

11. The system of claim 9, wherein the processor copies said image during a firmware interface stage.

12. The system of claim 9, wherein the storage and the different storage are coupled to each other via a communications network.

13. The system of claim 9, wherein the storage and the different storage comprise hard disks.

14. The system of claim 9, wherein the processor copies the image from the different storage to the storage to restore the operating system corresponding to the selected partition.

15. A method, comprising:
   copying a group of files from a first storage to a second storage, said group of files pertaining to an operating system stored on said first storage and used to restore said operating system on said first storage;
   wherein the group of files is copied during a boot-up sequence and prior to launch of the operating system stored on said first storage in said boot-up sequence.

16. The method of claim 15 further comprising restoring said group of files from the second storage to the first storage.

17. The method of claim 15, wherein said second storage is coupled to the first storage via a communications network.

18. The method of claim 15, wherein said second storage is selected from the group consisting of a hard drive, a storage area network, a disk array and a removable medium.

19. The method of claim 15, wherein copying said group of files comprises copying said group of files during a firmware stage.

* * * * *